United States Patent
Nelson (10) Patent No.: US 8,276,403 B2
(45) Date of Patent: Oct. 2, 2012

(54) METHOD AND APPARATUS FOR REDUCING TIN OXIDE IN FLOAT GLASS PRODUCTION

(75) Inventor: Douglas M. Nelson, Curtice, OH (US)

(73) Assignee: Pilkington Group Limited, St. Helens (GB)

( * ) Notice: Subject to any disclaimer, the term of this patent is extended or adjusted under 35 U.S.C. 154(b) by 0 days.

(21) Appl. No.: 13/138,631

(22) PCT Filed: Mar. 25, 2010

(86) PCT No.: PCT/US2010/000890
§ 371 (c)(1),
(2), (4) Date: Sep. 13, 2011

(87) PCT Pub. No.: WO2010/117412
PCT Pub. Date: Oct. 14, 2010

(65) Prior Publication Data
US 2012/0000248 A1 Jan. 5, 2012

Related U.S. Application Data

(60) Provisional application No. 61/164,958, filed on Mar. 31, 2009.

(51) Int. Cl.
*C03B 18/20* (2006.01)
*C03B 18/00* (2006.01)
*C03B 18/08* (2006.01)

(52) U.S. Cl. .......................... 65/99.4; 65/182.3
(58) Field of Classification Search ........... 65/99.1–101, 65/157, 182.1–182.5, 187–206
See application file for complete search history.

(56) References Cited

U.S. PATENT DOCUMENTS

| | | | | |
|---|---|---|---|---|
| 3,083,551 A * | 4/1963 | Pilkington | ..................... | 65/32.5 |
| 3,241,938 A * | 3/1966 | Michalik | ........................ | 65/99.6 |
| 3,332,763 A * | 7/1967 | Basler et al. | .................... | 65/32.5 |
| 3,337,322 A * | 8/1967 | Taylor | ............................. | 65/32.5 |
| 3,356,476 A * | 12/1967 | Gulotta | ............................ | 65/27 |
| 3,395,996 A * | 8/1968 | Loukes | ............................. | 65/27 |
| 3,462,253 A * | 8/1969 | Sensi | ............................. | 65/99.4 |
| 3,487,659 A * | 1/1970 | Yukiya et al. | .................... | 65/25.3 |
| 3,489,543 A * | 1/1970 | Hideo et al. | ..................... | 65/25.3 |
| 3,525,601 A * | 8/1970 | Mobuyoshi | ...................... | 65/168 |
| 3,528,795 A * | 9/1970 | Swillinger | ................... | 65/182.3 |

(Continued)

FOREIGN PATENT DOCUMENTS

DE  10 2007 011899 A1  9/2008

(Continued)

*Primary Examiner* — Matthew Daniels
*Assistant Examiner* — Jodi C Franklin
(74) *Attorney, Agent, or Firm* — Marshall & Melhorn, LLC (57) ABSTRACT

A method for removing oxygen from molten tin in the float bath chamber of a float glass manufacturing process is provided. The method includes providing a chamber having within it molten metal and a gaseous atmosphere above the molten metal, providing at least one reducing gas container proximate the interface between the molten metal and the gaseous atmosphere, providing a source of a reducing gas, and directing the reducing gas to the at least one container. In the at least one container, the reducing gas reacts with the oxygen in the molten metal. The method may include removing a vapor/particulate stream from the float bath chamber. The method may also include removing the vapor and/or the particulate from the stream. An apparatus for removing oxygen from the molten tin is also provided.

17 Claims, 5 Drawing Sheets

U.S. PATENT DOCUMENTS

| | | | |
|---|---|---|---|
| 3,594,143 A | 7/1971 | Mohyuddin | |
| 3,607,199 A * | 9/1971 | Itakura et al. | 65/182.3 |
| 3,607,203 A * | 9/1971 | Fujimoto et al. | 65/182.3 |
| 3,625,026 A * | 12/1971 | Cocker | 65/99.4 |
| 3,630,701 A * | 12/1971 | Javaux et al. | 65/27 |
| 3,663,196 A * | 5/1972 | Dickinson et al. | 65/182.4 |
| 3,681,042 A * | 8/1972 | Edwards et al. | 65/60.2 |
| 3,795,500 A * | 3/1974 | Murphy | 65/99.4 |
| 3,970,442 A * | 7/1976 | Gulotta | 65/32.5 |
| 3,976,460 A * | 8/1976 | Kompare et al. | 65/32.5 |
| 4,081,262 A * | 3/1978 | Fuhrman et al. | 65/99.4 |
| 4,148,622 A * | 4/1979 | Heitzer et al. | 65/99.3 |
| 4,260,407 A * | 4/1981 | Schwenninger | 65/99.6 |
| 5,364,435 A * | 11/1994 | Nelson | 65/32.5 |
| 6,094,942 A * | 8/2000 | Falleroni et al. | 65/99.2 |
| 6,100,209 A * | 8/2000 | Bentem et al. | 501/19 |
| 2006/0260362 A1 * | 11/2006 | Uhlik et al. | 65/182.3 |

FOREIGN PATENT DOCUMENTS

| | | |
|---|---|---|
| DE | 10 2007 011900 A1 | 9/2008 |
| EP | 0 884 284 A1 | 12/1998 |
| GB | 1 011 902 A | 12/1965 |

* cited by examiner

METHOD AND APPARATUS FOR REDUCING TIN OXIDE IN FLOAT GLASS PRODUCTION

RELATED APPLICATIONS

This application, which is a national phase filing under 35 USC 371 of PCT international application No. PCT/US2010/000890 filed Mar. 25, 2010, pending as of the filing of the present application, claims the benefit of and priority to provisional application No. 61/164,958 filed Mar. 31, 2009, the contents of which are hereby incorporated by reference.

BACKGROUND OF THE INVENTION

The invention relates to float glass production and, more particularly, to a method and apparatus for reducing the formation of tin oxide in a float bath.

In the float glass process, a glass ribbon floats on a surface of molten metal contained within a float bath chamber. The interior volume of the float bath chamber is generally divided between the bath of molten metal, typically molten tin, and a gaseous atmosphere above the molten metal to prevent oxidation. Nonetheless, oxidation of the molten tin still occurs by either small amounts of oxygen penetrating the float bath chamber and/or oxygen being released into the molten tin from the glass ribbon.

Oxygen is released into the molten tin from the glass ribbon in several ways. Oxygen can be released from the top surface of the glass ribbon and oxidize the molten tin through gaseous diffusion. Additionally, oxygen can be directly released into the molten tin through the contact between the molten tin and the bottom surface of the glass ribbon. In the float bath chamber, oxygen will react with the molten tin to create tin oxide. The majority of the tin oxide created will be in the form of SnO but some amount of $SnO_2$ may also exist.

In the float bath chamber, tin oxide exists as a solid. A portion of the tin oxide will float on the surface of the molten tin and the remaining tin oxide will dissolve into the molten tin. The amount of tin oxide floating on and the amount of tin oxide dissolved in the molten tin will be determined based on the total amount of tin oxide present and the temperature of the molten tin. For instance, the higher the temperature in the float bath chamber, the greater the solubility of tin oxide will be in the molten tin.

Tin oxide in the float bath chamber can cause defects in the glass ribbon. For example, as the bottom surface of the glass ribbon contacts the molten tin some tin oxide, in the form of SnO, will be absorbed into the glass. Later, when the glass is further processed, such as during lehring, tempering, or the toughening process, this SnO will further oxidize to $SnO_2$ resulting in the glass article having a higher haze value. Therefore, removal of oxygen and elimination of tin oxide in the float chamber is highly desirable.

It is known to use a reducing gas, such as hydrogen, to scavenge oxygen from a float bath. In order to minimize the amount of tin oxide undesirably formed by reaction of oxygen with the molten tin, large quantities of reducing gases are typically used to maintain a thermodynamic chemical equilibrium in the float bath. However, using large quantities of reducing gases can also produce undesirable effects. For instance, hydrogen in the bath atmosphere can react with gaseous tin sulfide as well as condensed tin sulfide producing liquid tin droplets on surfaces in the float bath chamber which can "drip down" onto the glass ribbon causing additional glass defects. Thus, those skilled in the art continue to seek a way to reduce the formation of the tin oxide in the float bath in a cost effective manner.

SUMMARY OF THE INVENTION

The present invention has been found to advantageously control the amount of tin oxide in the molten tin without increasing the normal amount of reducing gas in the float bath chamber. In fact, the usage of reducing gas in the atmosphere may actually be decreased by 5-90% over conventional float glass processes. At the same time the amount of tin oxide found on and in the molten tin remains the same as in conventional float glass processes.

The present invention is directed to a method of maximizing the utilization of a reducing gas, such as hydrogen, to remove unwanted oxygen from the float bath portion of a float glass manufacturing process. The method includes providing a chamber having within it molten metal contaminated by oxygen and a gaseous atmosphere above the molten metal. Proximate the interface between the molten metal and the gaseous atmosphere, at least one reducing gas container is provided. An external source of a reducing gas is then provided to the chamber. The reducing gas is directed to a location proximate the at least one container, where it chemically reacts with the contaminated molten metal and whereby a vapor stream comprising reducing gas and water vapor is formed.

The present invention is also directed to an apparatus for reducing tin oxide. The apparatus includes a reducing gas container having an outer surface defining at least one cavity. A reducing gas is contained within the at least one cavity. At least one orifice is formed in the container to admit the reducing gas.

In accordance with the invention, usage of "new" reducing gas, over a period of time, may be reduced by >50%, or even preferably >90%, over known float glass processes.

BRIEF DESCRIPTION OF THE SEVERAL VIEWS OF THE DRAWING

The above, as well as other advantages of the present invention, will become readily apparent to those skilled in the art from the following detailed description when considered in light of the accompanying drawings in which.

DETAILED DESCRIPTION OF THE INVENTION

It is to be understood that the invention may assume various alternative orientations and step sequences, except where expressly specified to the contrary. It is also to be understood that the specific reducing gas container(s) and method illustrated in the attached drawings, and described in the following specification are simply exemplary embodiments of the inventive concepts defined in the appended claims. Hence, specific dimensions, directions, or other physical characteristics relating to the embodiments disclosed are not to be considered as limiting, unless the claims expressly state otherwise. Additionally, although the invention will be described in connection with a float glass process, it would be understood by one of ordinary skill in the art that the reducing gas containers and the method for their use described herein have applications to other processes used to reduce metal oxides and/or prevent molten metal oxidation.

Figure 1:
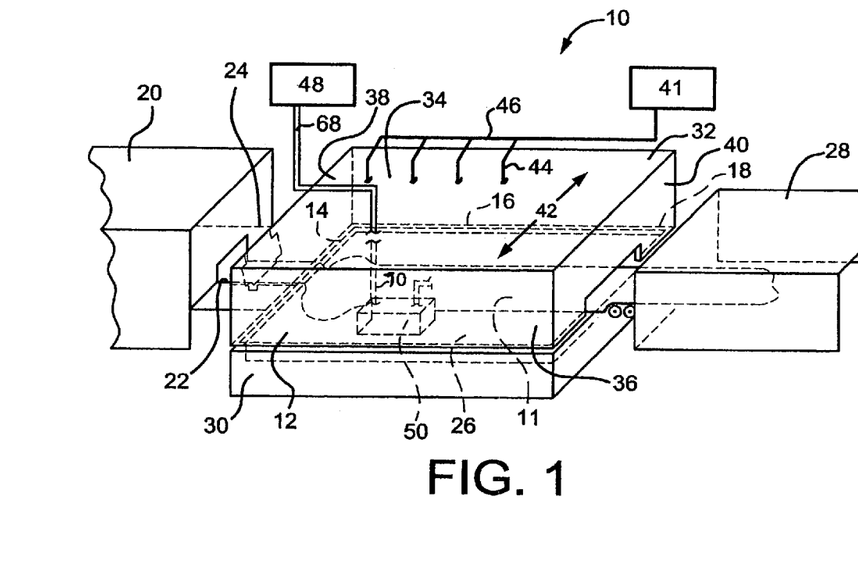
FIG. 1 is a perspective view of an apparatus for practicing the invention in a float glass manufacturing process.

FIG. 1 shows a partial perspective view of an apparatus for practicing the invention in a float glass manufacturing process 10. The float bath chamber 12 comprises an upstream section 14, an intermediate section 16, and a downstream section 18. Molten glass, typically in the form of a continuous ribbon 11, exits a melting furnace 20 and enters the float bath chamber 12 via the canal 22. In operation, the molten glass 11 flows along the canal 22 beneath a regulating tweel 24 and downwardly onto the surface of the molten tin 26 in controlled amounts. On the molten tin 26, the molten glass 11 spreads laterally under the influences of gravity, surface tension, and certain mechanical influences. After entering the upstream float bath chamber section 14, the glass ribbon 11 then advances through the intermediate float bath chamber section 16 and through the downstream float bath chamber section 18 to an annealing lehr 28 and a cooling section (not depicted).

Figure 2:
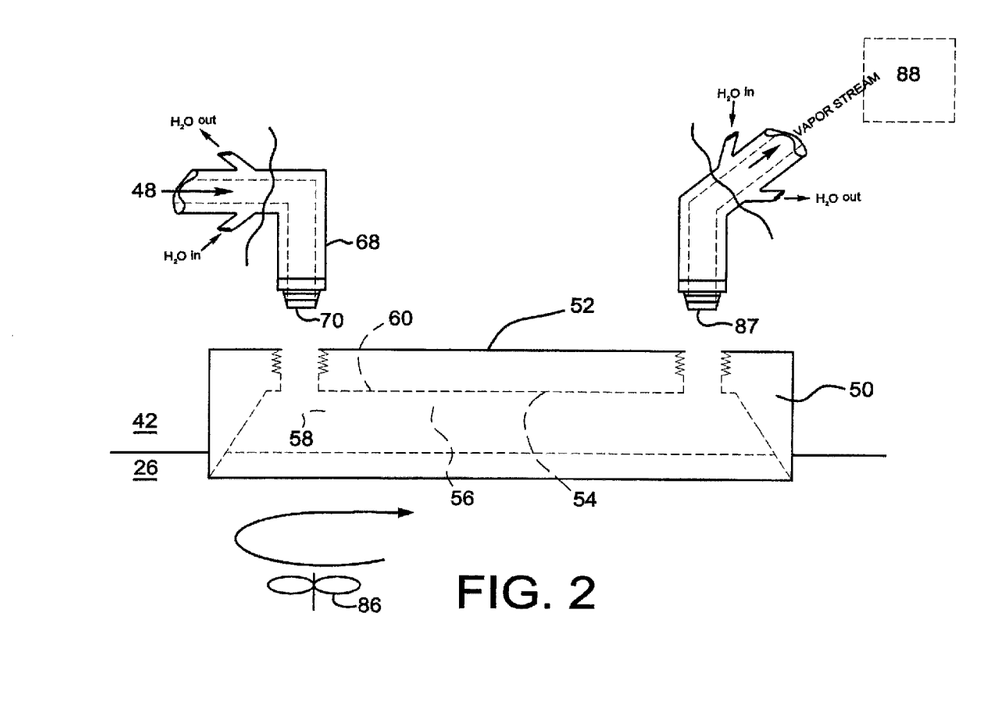
FIG. 2 is an exploded cross-sectional view of the inner chamber of a float bath chamber depicting an embodiment of the container provided to practice the method of the present invention.

As shown in FIGS. 1 and 2, the float bath chamber 12 includes a bottom section 30 within which the molten tin 26 is contained, a roof 32, opposite sidewalls 34, 36, and end walls 38, 40. The bottom section 30, the roof 32, the side walls 34, 36, and the end walls 38, 40 together define an enclosure having a predetermined internal volume. Typically, a minority of the total internal volume comprises molten tin 26 and a majority of the total internal volume comprises a gaseous atmosphere in the space 42 above the molten tin 26.

The atmosphere in the space 42, provided from a source of atmosphere gas(es) 41, comprises nitrogen or a mixture of nitrogen and a reducing gas in which nitrogen predominates. For the purposes of the present invention, the atmosphere in the space 42 may comprise another inert gas besides nitrogen. The atmosphere in the space 42 is typically admitted through conduits 44 coupled to a distribution manifold 46. The atmosphere in the space 42 is introduced at a rate sufficient to compensate for normal losses and maintain a slight positive pressure, on the order of about 0.001 to about 0.01 atmospheres above ambient atmospheric pressure, so as to prevent infiltration of oxygen-containing air. For purposes of the present invention, the above-noted pressure range is considered to constitute normal atmospheric pressure.

It is known to use a reducing gas, such as hydrogen, as part of the atmosphere in the space 42 to scavenge oxygen from the float bath chamber 12. In order to minimize the amount of tin oxide undesirably present in the molten tin 26, large quantities of reducing gases are used to maintain a thermodynamic chemical equilibrium in the float bath chamber 12.

The present invention allows the total quantity of reducing gas used in the float bath chamber 12 to be decreased by increasing the concentration of the reducing gas at the molten tin 26/atmosphere interface. The reducing gas concentration is increased by providing reducing gas from a reducing gas source 48 to at least one reducing gas container 50 proximate the interface between the molten tin 26 and the bath atmosphere in the space 42. In one embodiment, the at least one container 50 comprises carbon, preferably graphite. A container 50 comprising carbon is advantageous because carbon itself is a reducer and is not soluble in molten tin. Additionally, due to density differences, a carbon container 50 may float on the surface of the molten tin 26. Flotation ensures that the container 50 will maintain a position proximate the molten tin 26/atmosphere interface when the depth of the molten tin 26 changes. However, one skilled in the art would appreciate that the at least one container 50 need not be comprised of carbon to practice the present invention. For instance, the at least one container 50 may be comprised of any material not soluble in molten tin 26, such as a nonporous ceramic material. Furthermore, one skilled in the art would understand that the at least one container 50 need not float on the surface of the molten tin 26 to be proximate the molten tin 26/atmosphere interface and thus to practice the present invention.

As shown in FIG. 2, each reducing gas container 50 provided to practice the present invention is generally configured so that when the container 50 is placed onto the molten tin 26 a volumetric space or cavity 56 for containing the reducing gas is created. The cavity 56 may comprise planar shapes or may have a continuously smooth surface with no corners or edges. It is also possible to practice the present invention by combining planar shapes and smooth surfaces to create the cavity 56. Thus, in the embodiment of FIG. 2, the cavity 56 comprises substantially planar walls 58 and a substantially planar ceiling 60. In another embodiment illustrated in FIG. 3, the cavity 56 comprises a substantially conical shape 62. In another embodiment, the cavity comprises at least a partial elliptical shape.

Figure 3:
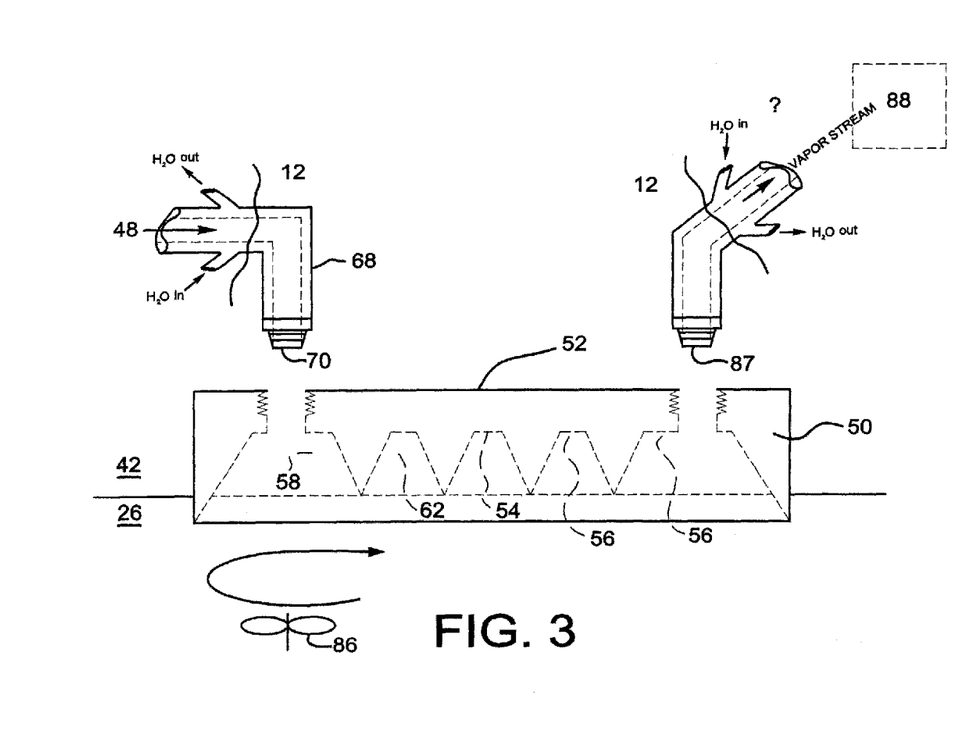
FIG. 3 is an exploded cross-sectional view of the inner chamber of a float bath chamber depicting another embodiment of the container provided to practice the method of the present invention.

Each reducing gas container 50 used to practice the present invention may comprise at least one cavity 56. Thus, in one embodiment, the at least one container 50 comprises one cavity 56. However, as depicted in the embodiment of FIG. 3, one or more of the containers may comprise two or more cavities. Using a container 50 having multiple cavities 56 is preferable because the flow rate of the reducing gas from beneath the carbon container 50 is slowed by the multi-cavity 56 configuration. Multiple cavities 56 thus may allow a more complete chemical reaction to occur by increasing the retention time of the reducing gas in the container 50. Each container 50 comprising two or more cavities 56 may have cavities 56 of equal volume. Alternatively, each may have cavities 56 where some or all of the cavities 56 have different volumes. Regardless of the number of cavities 56 formed, the cavities 56 are preferably formed in the container 50 on its surface closest to the molten metal 26.

In practicing the present invention, it may be preferable to maintain the cavity/cavities' 56 pressure below the pressure of the float bath chamber atmosphere in the space 42. Thus in an embodiment, a vacuum device is in fluid communication with the cavity/cavities 56. However, the number and location of the containers 50 utilized to practice the present invention will depend on the desired amount of tin oxide reduction, the characteristics of the float bath chamber 12, the characteristics of the glass ribbon 11, and/or the type of reducing gas utilized.

Typically, a float bath chamber 12 will have a temperature profile maintained by internal heaters and the radiant heat of the glass ribbon 11. Generally, the temperature of the float bath chamber 12 trends down as the glass ribbon 11 moves from the upstream section 14 to the downstream section 18. Thus, the upstream section 14 will have temperatures greater than the intermediate section 16 and the intermediate section 16 will have temperatures greater than the downstream section 18. Tin oxide reduction will occur at a temperature which largely depends on the reducing gas utilized. Thus, to maximize the effectiveness of the reducing gas utilized, the at least one reducing gas container 50 should be provided in the float chamber section 14, 16, 18 corresponding to the activation temperature of the reducing gas/tin oxide reduction chemistry.

Additionally, in order to reduce tin oxide before it is absorbed into the glass 11, the location of the at least one reducing gas container 50 may need to be proximate the location of significant sources of oxygen penetration into the float bath chamber 12. Generally, the main source of oxygen penetration into the float bath chamber 12 occurs where the glass ribbon 11 enters the chamber 12 in the upstream float bath chamber section 14. Thus, at least one reducing gas container 50 may be located in the upstream section 14. However, significant oxygen penetration may occur in areas other than the upstream section 14. For instance, significant oxygen penetration may occur during the insertion of gas distributor beams for coating layer deposition processes in the intermediate 16 and/or downstream sections 18 of the float bath chamber 12. Thus, at least one reducing gas container 50 may be provided in either section 16, 18 and may also be provided in multiple float bath chamber sections 14, 16, 18.

Therefore, in one embodiment, the method of the present invention comprises providing at least one reducing gas container 50 in the upstream float bath chamber section 14. In another embodiment, the method of the present invention comprises providing at least one reducing gas container 50 in the intermediate float bath chamber 16. In yet another embodiment, the method of the present invention comprises providing at least one reducing gas container 50 in the downstream float bath chamber section 18. One skilled in the art would appreciate that when multiple containers 50 are used, at least one reducing gas container 50 may be located in any of the float bath chamber sections 14, 16, 18.

It is preferable that none of the reducing gas containers 50 located in the float bath chamber 12 interfere with the glass ribbon 11 as it moves through the float bath chamber 12. Thus, typically each reducing gas container 50 is positioned in the float bath chamber 12 between the edge of the glass ribbon 11 and the side walls of the chamber 12. In one embodiment, at least one reducing gas container 50 is provided between the glass ribbon 11 and each of the float bath chamber sidewalls 34, 36. However, it is also possible to incorporate at least one container 50 into the bath chamber sidewalls 34, 36. Thus, in another embodiment there is at least one reducing gas container 50 incorporated into each bath sidewall 34, 36 on opposite sides of the glass ribbon 11. When a container is incorporated into a sidewall 34, 36, it may be permanently connected or it may be connected so that it can be removed from the float bath chamber 12 for replacement and/or repair.

The reducing gas used in the present invention may be provided from a reducing gas source 48 external to the float bath chamber 12. The reducing gas may also be of a high quality or purity. However, those skilled in the art would appreciate that the present invention is not limited by the purity of the reducing gas or the location of its source. Thus, in an embodiment, the reducing gas comprises one gas. However, in another embodiment, the reducing gas comprises a combination of gases selected from ethane, methane, hydrogen, ammonia, and carbon monoxide. In yet another embodiment, the reducing gas may comprise at least one gas from the list above and at least one inert gas such as helium, nitrogen, or argon.

When the source of the reducing gas 48 is external to the float bath chamber 12, the reducing gas is directed into the float bath chamber 12 to be released at the interface of the molten tin 26 and the atmosphere 42 proximate the at least one reducing gas container 50. Preferably, the reducing gas is directed so that it can be contained within the at least one container cavity or cavities 56. This serves a dual purpose. First, it allows the stream of reducing gas to flow beneath a container 50 to chemically react with tin oxide. Second, it increases the residence time of the reducing gas, which allows for a more complete chemical reaction.

One skilled in the art would also recognize that another factor in determining the residence time of the reducing gas is the flow rate of the reducing gas from its source. There are several embodiments of the present invention for directing reducing gas into a cavity 56 of a reducing gas container 50. As shown in FIGS. 1-3, in one embodiment the reducing gas is directed into the container 50. In this embodiment, the reducing gas may be contained within a water cooled pipe 68 as it enters the float bath chamber 12. The water cooled pipe 68 may extend from a location outside the float bath chamber 12 to the outer surface of the upstream-most container or containers 50. The water cooled pipe 68 and the container 50 are connected via a first orifice 70 located in the first portion of the container 50. The first orifice 70 extends from the outer surface 52 of the container 50 through to the inner surface 54 and the cavity 56.

Figure 4:
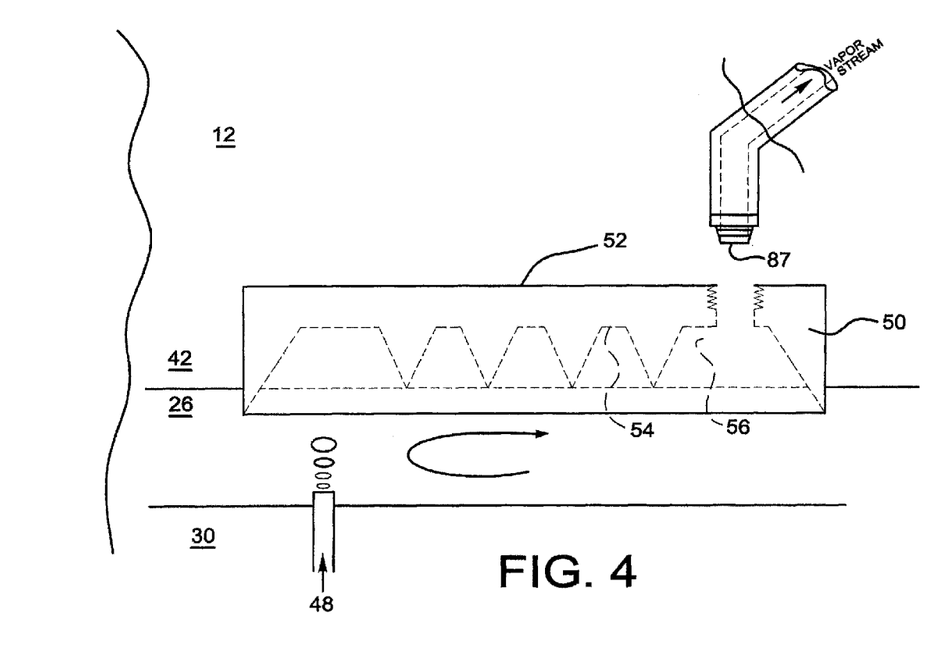
FIG. 4 is an exploded cross-sectional view of the inner chamber of a float bath chamber depicting the method for directing reducing gas in the present invention.

As shown in FIG. 4, in another embodiment the reducing gas is directed to a cavity 56 via injecting the reducing gas into the molten tin 26. In one embodiment, the reducing gas is delivered to a location in the bottom section 30 of the float bath chamber 12 below a reducing gas container 50. In another embodiment, the reducing gas is delivered to a location in the float bath chamber sidewall 34, 36 below the surface of the molten tin 26. The reducing gas is released into the molten tin 26 and it diffuses through the molten metal 26 until it reaches a cavity 56. This method of reducing gas delivery may be preferred when the reducing gas contains carbon.

Figure 5:
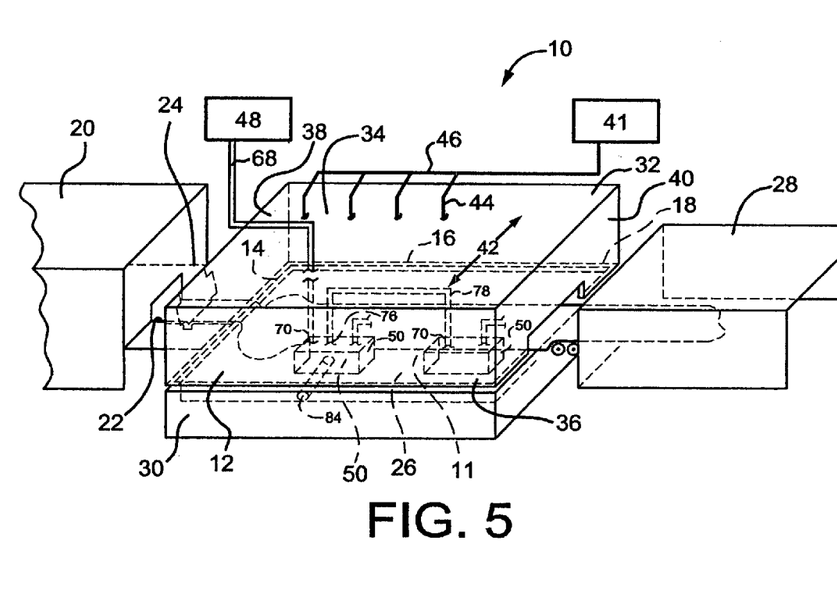
FIG. 5 is a perspective view of an apparatus for practicing the invention in a float glass manufacturing process wherein multiple reducing gas containers are utilized.

As best seen in FIG. 5, when multiple reducing gas containers 50 are utilized the reducing gas may flow from one container 50 to another. Thus, each container may also comprise a second orifice 76. The second orifice 76, like the first orifice 70, extends from the outer surface 72 to the inner surface 74 of the container 50. The second orifice 76 may also be located in the first portion of the container 50 but is preferably located in the middle or end section. Having a second orifice 76 allows one container 50 to be connected to another container 50. One skilled in the art would recognize that a single container 50 may also be linked to multiple containers 50 through the second orifice 76. Additionally, each container 50 may have a plurality of orifices 70, 76 for connecting directly to a plurality of containers 50.

Still referring to FIG. 5, the present invention may further comprise connecting multiple reducing gas containers 50 by a hollow tube 78. The tube 78 is preferably hollow to allow reducing gas to flow between the containers 50. The hollow tube 78 has a first end portion 80 connected to the second orifice 76 of a first container 50 located upstream and a second end portion 82 connected to the first orifice 70 of a container 50 located downstream of the first container 50. However, one skilled in the art would recognize that the present invention may be practiced even when multiple containers 50 are not connected to each other via a hollow tube 78 and each container has its own external reducing gas source.

The movement of the glass ribbon 11 through the float bath chamber 12 creates currents in the molten tin 26. Thus, the at least one reducing gas container 50 may need to be fixed to a support 84 so that it does not interfere with the movement of the glass ribbon 11. Therefore, the at least one container 50 may be rigidly attached to a support 84. In an embodiment, the support 84 is comprised of the same material as the container 50. In another embodiment, the support 84 may comprise a water cooled pipe 68 located in the float bath chamber 12. When reducing gas is introduced directly into a container 50, the water cooled pipe 68 used to deliver the reducing gas may serve as the support 84. However, when reducing gas is delivered through the bottom section 30 or sidewalls 34, 36 of the float bath chamber 12, a separate support 84 may be required. Whereas, if the at least one container 50 is incorporated into a bath sidewall 34, 36, the float bath chamber 12 itself may serve as support 84 for the at least one container 50.

In addition to their effect on the reducing gas containers 50, tin currents may provide a beneficial effect in conjunction with the method of the present invention. For instance, by helping to circulate contaminated molten tin 26 beneath the container 50, tin currents may improve the efficiency of the reducing gas in removing oxygen from the molten tin 26. This effect may further reduce the amount of reducing gas utilized and/or the cavity 56 size(s), and thus the overall size, of the container(s) 50. Those skilled in the art would appreciate that the term "helping to circulate", in this context, refers to changes in the molten tin current(s) and/or circulation pattern(s) in the bath section other than those caused by the movement of the glass ribbon 11 on the surface of the molten tin 26. Also, those skilled in the art would recognize that the term "changes in the molten tin current(s) and/or circulation pattern(s)" is not limited in scope to merely the amount or the frequency of molten tin movement. Rather, it could comprise changes in the force and/or the direction of the molten tin movement. Thus, in an embodiment, the present invention comprises changing the movement of the molten tin 26.

Current(s) and/or the circulation pattern(s) in the molten tin 26 may be changed by providing a tin current apparatus 86. Thus, in an embodiment the present invention comprises providing at least one tin current apparatus 86. The tin current apparatus 86 may change tin current(s) and/or circulation pattern(s) by directly contacting the molten tin 26 or without contacting the molten tin. For directly contacting the molten tin 26, the tin current apparatus 86 may comprise a mechanical paddle or stirrer disposed in the molten tin, as shown in FIG. 2. Those skilled in the art would recognize that other tin current apparatus 86 could be used in practicing the present invention, such as a stationary carbon barrier positioned at least partially below the surface of the molten tin 26. For non-contact changes in tin current(s) and/or circulation pattern(s), an electromagnetic induction container may be provided. Furthermore, when multiple tin current apparatus 86 are provided, at least one apparatus may be a contact apparatus and at least one container may be a non-contact apparatus.

Initially, the reducing gas is directed into the float bath chamber 12 to be released at the interface of the molten tin 26 and the gaseous bath atmosphere 42 proximate the at least one reducing gas container 50 so that the stream of reducing gas will flow beneath the at least one container 50 to chemically react with tin oxide. Depending on the method for delivering the reducing gas and the reducing gas chosen, the reaction may produce a vapor stream comprising unreacted reducing gas and water vapor.

If a vapor stream is produced, then upon exiting the at least one reducing gas container 50, it may be removed from the float bath chamber 12 via orifice 87 and collected by an appropriately located filtration system 88. The contaminants formed, typically carbon particulate and/or water vapor, can be removed from the vapor stream by further processing. For example, the contaminants can be removed via a filtration system and/or via cooling. However, the present invention is not limited to removing vapor/particulate by filtration and/or cooling. Thus, other commonly known methods for removing vapor and/or particulate from a stream are capable of being used in practicing the present invention. For instance, in one embodiment the vapor may be removed by adsorption. In another embodiment, vapor may be removed by a condenser. In yet another embodiment, the particulate may be removed by electrostatic precipitation.

After being processed, the vapor stream comprising unreacted reducing gas can then be directed back into the float bath chamber 12 at a location proximate the at least one reducing gas container 50 and at the interface between the molten metal 26 and the atmosphere in the space 42 to remove additional oxygen. Thus, depending on the reducing gas used and the byproducts produced, the unreacted reducing gas may be reused. In this way, after removing the contaminants from the reducing gas and returning it to the float bath chamber 12 for further reaction, the need for additional, or "new" reducing gas, is greatly reduced, e.g. by >50%, preferably >90% over known float glass processes The present invention has been found to advantageously reduce the amount of tin oxide in the molten tin 26 without increasing the amount of reducing gas in the float bath chamber 12. The present invention may also decrease the total amount of reducing gas used to scavenge oxygen by increasing the residence time and/or the concentration of the reducing gas in the float bath chamber 12 at the interface of the molten tin 26 and the gaseous atmosphere in the space 42. Additionally, maintaining the reducing gas by this method may also decrease the amount of gaseous tin sulfide in the float bath atmosphere.

In accordance with the provisions of the patent statutes, the present invention has been disclosed in what are considered to represent its preferred embodiments. However, it should be noted that the invention can be practiced otherwise than as specifically illustrated and described without departing from its spirit or scope.

What is claimed is:

1. A method of removing oxygen from molten metal in the float bath chamber of a float glass manufacturing process comprising:
   providing a chamber having within it a glass ribbon and molten metal, the molten metal contaminated by oxygen, and a gaseous atmosphere above the glass ribbon and molten metal, there being an interface between the molten metal and the gaseous atmosphere;
   providing at least one reducing gas container on the molten metal between a sidewall of the chamber and the glass ribbon, wherein the at least one reducing gas container and the molten metal form a cavity and wherein a perimeter of the cavity is formed by an inner surface of the at least one reducing gas container and the molten metal;
   providing a source of a reducing gas which is external to the chamber;
   directing the reducing gas into the cavity, wherein the oxygen in the molten metal chemically reacts with the reducing gas to form a vapor stream comprising reducing gas and water vapor; and
   removing the reducing gas and water vapor from the cavity.

2. The method defined in claim 1, wherein the molten metal is primarily tin.

3. The method defined in claim 1, wherein the reducing gas container floats on the molten metal.

4. The method defined in claim 3, wherein the reducing gas container comprises graphite.

5. The method defined in claim 1, wherein the reducing gas comprises hydrogen.

6. The method defined in claim 1, wherein the reducing gas is selected from the group consisting of ethane, methane, ammonia, and carbon monoxide.

7. The method defined in claim 1, wherein the gaseous atmosphere comprises primarily nitrogen and hydrogen.

8. The method defined in claim 1, further comprising removing the vapor stream from the float bath chamber.

9. The method defined in claim 1, wherein the vapor stream further comprises particulate.

10. The method of claim 9, further comprising removing the vapor and particulate from the vapor stream and reintroducing the stream to the float bath chamber.

11. The method defined in claim 1, wherein the at least one reducing gas container is provided on each side of the glass ribbon.

12. The method defined in claim 1, wherein the reducing gas is directed to at least one cavity formed in the reducing gas container.

13. The method defined in claim 12, further comprising providing fluid communication between the at least one cavity and a source of vacuum.

14. An apparatus for float glass manufacturing comprising:
- a float bath chamber containing a glass ribbon, a bath of molten metal and a space filled with a gaseous atmosphere above the glass ribbon and bath of molten metal, an interface being defined between the bath of molten metal and the gaseous atmosphere;
- at least one reducing gas container provided on the molten metal and secured within the float bath chamber between a sidewall of the float bath chamber and the glass ribbon wherein the at least one reducing gas container and molten metal form a cavity and wherein a perimeter of the cavity is formed by an inner surface of the at least one reducing gas container and the molten metal; and
- a source of a reducing gas in communication with the cavity, such that reducing gas can be directed to the cavity.

15. The apparatus defined in claim 14, wherein the molten metal is comprised of tin or alloys thereof.

16. The apparatus defined in claim 14, wherein the at least one reducing gas container comprises one or more cavities formed over the molten metal.

17. The apparatus defined in claim 16, further comprising a source of vacuum in fluid communication with one or more cavities.

\* \* \* \* \*